Figure 1:
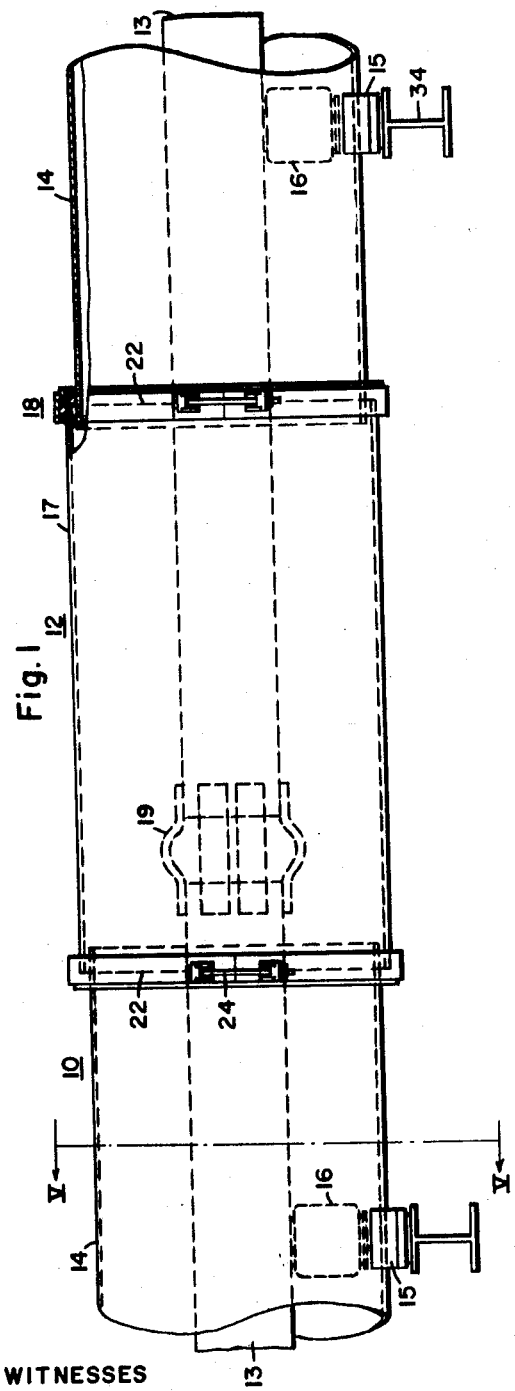

Oct. 30, 1962    H. H. RUGG ET AL    3,061,665
ELECTRICAL BUS STRUCTURE
Filed July 31, 1958    3 Sheets-Sheet 1

WITNESSES

INVENTORS
Harold H. Rugg &
Herman B. Wortman
BY
ATTORNEY

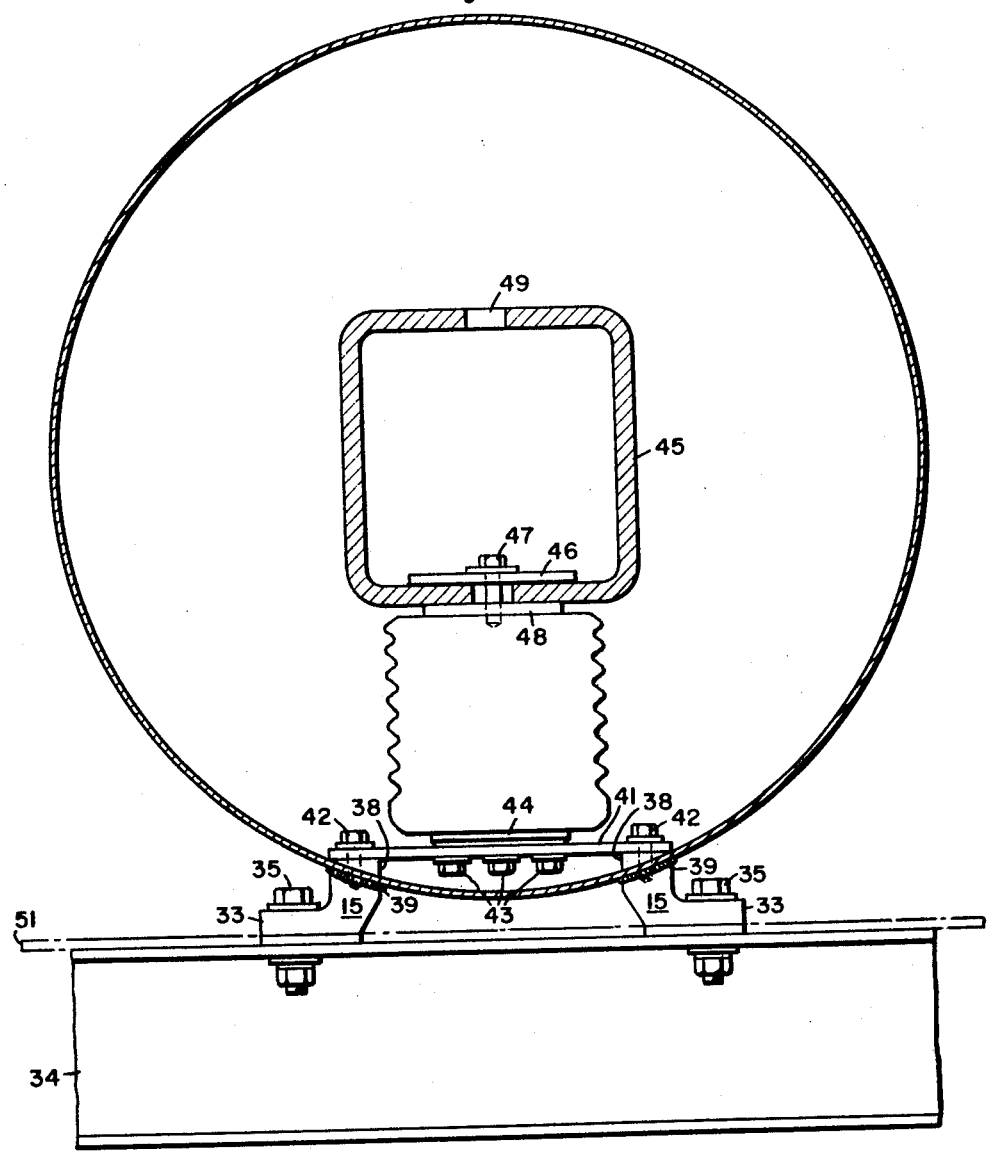

United States Patent Office
3,061,665
Patented Oct. 30, 1962

3,061,665
ELECTRICAL BUS STRUCTURE
Harold H. Rugg, Penn Hills, and Herman B. Wortman, Wilkinsburg, Pa., assignors to Westinghouse Electric Corporation, East Pittsburgh, Pa., a corporation of Pennsylvania
Filed July 31, 1958, Ser. No. 752,325
5 Claims. (Cl. 174—85)

This invention relates, generally, to electrical bus structures and, more particularly, to metal-enclosed isolated-phase bus structures of the type described in U.S. Patent No. 2,531,017, issued November 21, 1950, to C. P. West, H. H. Rugg and P. R. Pierson.

In the bus structure described in the aforesaid patent, an electrical conductor was mounted in a metal trough which was slightly more than semi-circular in cross section and was built in sections of predetermined lengths. The trough was supported by supporting members welded to the trough and having feet for attachment to a supporting structure. The conductor was supported by pairs of oppositely disposed insulators mounted in the trough at predetermined intervals. A removable cover was provided for each section of trough to complete the enclosure, and longitudinal gaskets were provided between the cover and the trough. Circumferential gaskets were provided at the joints between sections.

When the adjacent conductors of an alternating current bus structure are surrounded by metal enclosures of reasonably high electrical conductivity, such as aluminum, they are shielded from the magnetic flux of the other phases. This reduces the mechanical stress between the phase conductors, when carrying heavy short circuit currents, to less than 25 percent of the stress when the conductors are unshielded. Therefore, each conductor of an isolated-phase bus structure can be adequately supported by means of a single insulator at each support point, provided the insulator is properly constructed and mounted.

An object of this invention is to provide a resilient mounting for an insulator which supports a conductor inside a metal enclosure.

Another object of this invention is to provide an enclosed bus structure which needs no longitudinal gaskets, and which has simplified and improved circumferential gaskets at the ends of the sections of the tubular bus enclosure.

A further object of the invention is to provide for insulating a telescoping section of a bus enclosure from fixed sections of the enclosure, thereby preventing circulating currents at the joints between sections of the enclosure.

Still another object of the invention is to provide a releasable clamp for the gasket for a bus enclosure.

Other objects of the invention will be explained fully hereinafter or will be apparent to those skilled in the art.

In accordance with one embodiment of the invention, each phase enclosure of a multi-phase bus structure comprises a plurality of supporting sections and intermediate enclosures which telescope on the supporting sections. Circumferential gaskets are provided at the joints between sections. Each supporting section comprises a cylindrical housing near each end of which are attached two spaced supporting feet. Each foot has a rectangular portion which projects through a hole in the housing and has tapped holes therein for attaching one end of a steel strap or plate, thereby providing a resilient mounting for a single insulator for supporting a bus conductor inside the housing. The feet are sealed to the housing by external welds.

Figure 2:
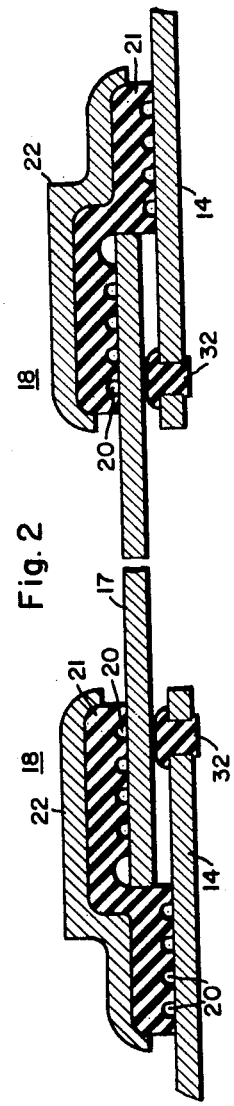
Figure 3:
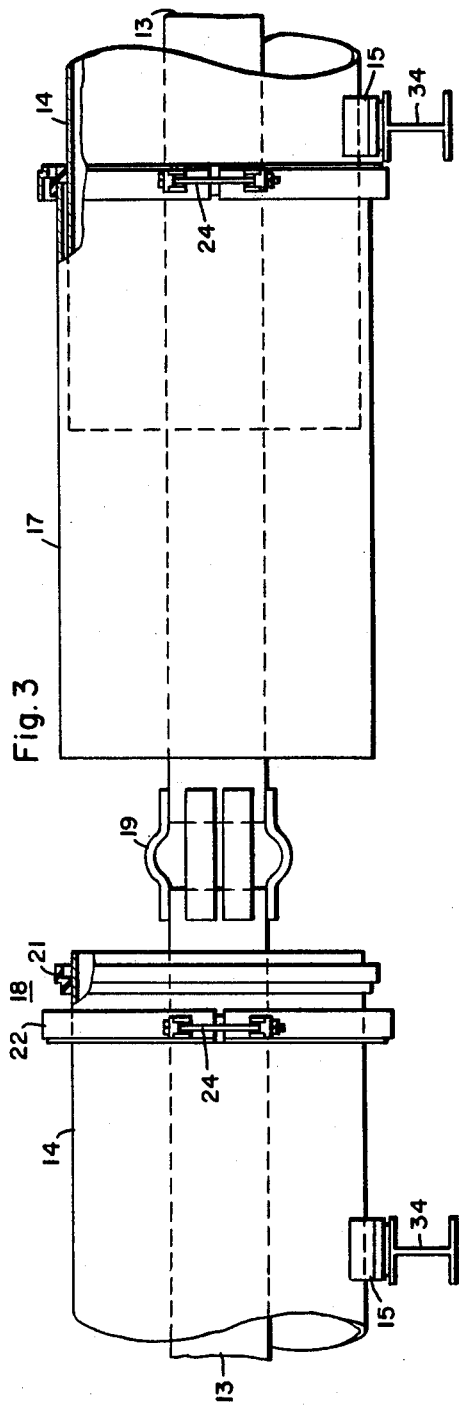
Figure 4:
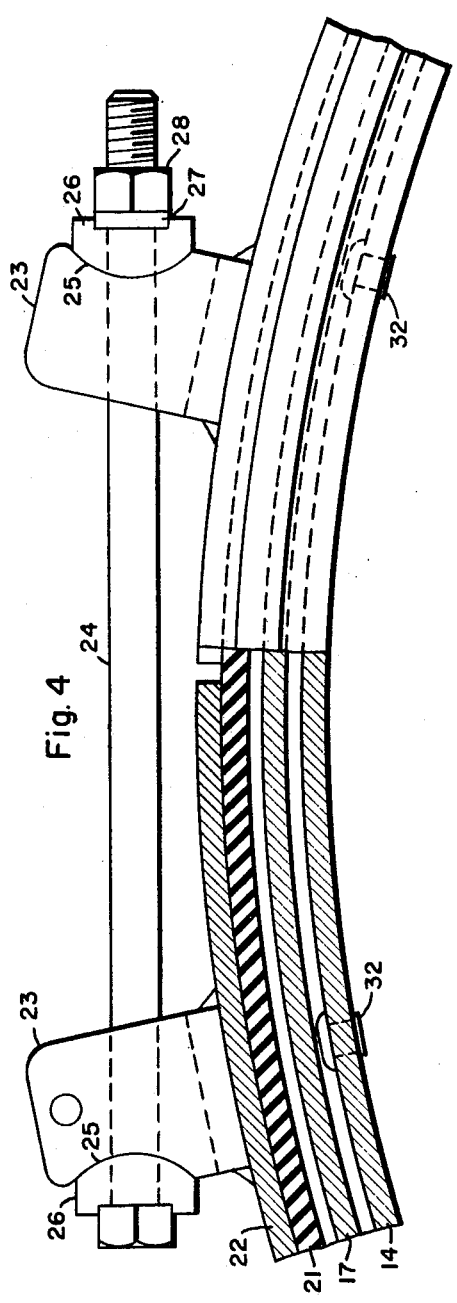

For a better understanding of the nature and objects of the invention, reference may be had to the following detailed description, taken in conjunction with the accompanying drawings, in which:

FIGURE 1 is a view, in side elevation, of a portion of a bus structure embodying the principal features of the invention;
FIG. 2 is an enlarged view, in section, of the gasketed joints between sections of the enclosure;
FIG. 3 is a view, similar to FIG. 1, showing the telescoping section opened for inspection of the bus;
FIG. 4 is an enlarged view, in section, of a portion of the gasket and the clamp for retaining the gasket in position; and
FIG. 5 is an enlarged view, partly in section and partly in elevation, taken along the line V—V in FIG. 1.

Referring to the drawings, and particularly to FIG. 1, the bus structure shown therein comprises two spaced supporting sections 10 and 11 and an intermediate or telescoping section 12. Each supporting section comprises a bus conductor 13, a cylindrical housing 14, two pairs of supporting feet 15, only one pair of which is shown in the drawings, and an insulator 16 for each pair of supporting feet. The housing 14 may be formed from heat treated aluminum sheets welded into a complete cylinder. Each foot 15 may be extruded from aluminum.

The telescoping enclosure comprises a cylindrical housing 17 which is of a slightly larger diameter than the housing 14. The housing 17 may be formed in a manner similar to the housing 14. As shown, the ends of the housing 17 overlap the ends of the housing 14 and the joints between the housing are sealed by gasket assemblies 18 which will be described more fully hereinafter. The ends of the bus bars are joined by flexible connectors 19 which may be bolted or welded to the bus bars.

As shown more clearly in FIGS. 2 and 4, each gasket assembly 18 comprises a circumferential gasket 21, which has a cross section generally of a Z-shape, a clamping band 22, the cross section of which is generally of the same shape as the cross section of the gasket 21, clamping lugs 23, welded to the band 22, and two clamping bolts 24. The gasket 21 may be formed from a high grade neoprene rubber vulcanized into an endless ring. As shown, one horizontal leg of the gasket engages the outside of the telescoping section 17. The other horizontal leg is offset from the first said leg and engages the outside of the support section 14 and the vertical leg engages the end of the telescoping section 17. The gasket is compressed against the enclosure by the clamping band 22 which is shaped to fit the outside of the gasket. The band 22 is preferably made from a heat-treated aluminum alloy extrusion. As shown in FIG. 2, the gasket has a plurality of grooves 20 in its horizontal legs thereby providing multiple line contact with the housing surfaces.

Each clamping band is preferably made in two semi-cylindrical halves with the clamping bolts 24 joining the two halves together. As shown in FIG. 4, each clamping lug 23 which is attached to one half of the band 22 has a curved surface 25. A washer 26 having a similar curved surface is disposed between one lug 23 and the head of the bolt 24. Another similar washer 26 is disposed between a lock washer 27 and the lug 23 on the other half of the band 22. Thus, when a nut 28 on the bolt 24 is tightened against the lock washer 27 the gasket 21 is compressed against both the housing sections to seal the joint between the housings. A similar clamping bolt 24 connects the other ends of the two halves of the band 22, thereby applying a uniform pressure on the gasket 21.

Referring to FIG. 2, it will be seen that the telescoping section 17 is spaced from a supporting section 14 by rivet-like spacers 32 which are composed of an insulating material and may be compressed in holes provided in the housing 14. In this manner the gasket 21 and the spacers 32 insulate the housings against circulating currents at each joint. Flexible jumpers may be added across the joints where necessary to ground all enclosures.

As shown more clearly in FIG. 5, each supporting foot 15 comprises a base 33, which may be attached to a cross beam 34 by bolts 35, and a rectangular portion 38 which projects through an opening in the housing 14. The opening around the portion 38 is sealed by an external weld 39. As shown in FIG. 5, the two portions 38 for each pair of feet 15 are spaced from each other inside the housing 14 and are spanned by a steel plate or strap 41 which is attached to each portion 38 by tap bolts 42. The insulator 16 is attached to the strap 41 by tap bolts 43 which are threaded into an insert 44 on the lower end of the insulator 16. The bus conductor 13 may consist of two channel members 45 welded together with spacing plates at intervals to form a hollow square. The conductor 13 is attached to the insulator 16 by means of a clamping plate 46 and tap bolts 47 which are threaded into an insert 48 in the upper end of the insulator 16.

Thus, the insulator 16 is resiliently supported by the strap 41, thereby permitting the insulator to withstand the forces resulting from short circuit currents in the bus conductors. As explained hereinbefore, the mechanical stress between phase conductors which are enclosed in metal housings of reasonably high electrical conductivity is reduced to a relatively small percentage of the stress between conductors which are not enclosed or shielded. Accordingly, the insulators 16, which are resiliently mounted, are enabled to withstand the forces resulting from heavy short circuit currents.

It will be noted that access to the bolts 47 may be had through an opening 49 in the conductor 13 opposite the bolts 47. When a cylindrical conductor is utilized in place of the hollow square conductor access holes may be provided in the cylindrical conductor to permit the conductor to be attached to the supporting insulator.

As shown in FIG. 3, the telescoping section 17 may be moved along one of the housing sections 14 after the clamping assemblies 18 are loosened. Thus, access may be had to the flexible connectors 19 which join the bus bars 13. Since the supporting feet 15 are located a short distance from each end of the supporting housing 14, access to the insulator at each end of the supporting housing may be had by moving the telescoping section in the proper direction to permit access to the desired insulator. The telescoping section may be moved in either direction by loosening both clamping assemblies.

It will be understood that the supporting sections of the enclosure are usually assembled in three phase groups on the cross beams 34. One end of each supporting section may be insulated from the cross beam by an insulating member 51. The other end may be connected to a ground bus, thereby grounding the enclosure. Adjacent phase enclosures may be tied together in the manner described in Patent 2,531,017 to strengthen the structure.

The enclosures and the supporting frame may be assembled at the factory in units suitable for shipment. If desired, certain of the joints may be welded at the factory or in the field when the complete structure is assembled. It will be noted that the joints between the sections are suitable for welding, if desired. Thus, a gasket of the type herein described may be utilized where it is desired to provide access to the inside of the enclosure and all other joints may be welded.

From the foregoing description it is apparent that the isolated phase bus structure herein described has the following advantages:

(1) Fewer insulators mean less possibility of insulation breakdown.

(2) Insulator on resilient mounting reduces short circuit force on porcelain.

(3) Longitudinal gaskets eliminated, reducing field assembly time and insuring tighter enclosures.

(4) Circular gaskets are continuous rings without end joints.

(5) Gaskets are high grade solid neoprene.

(6) Multiple line contact of gaskets insures good seal on housing surface.

(7) Joints are easy to assembly with two-bolt clamping rings.

(8) Clamping ring applies pressure directly to gasket.

(9) Additional pressure can be applied to gaskets at any time, if required.

(10) No flanges on housing ends to become damaged in handling and so adversely affect clamping action of rings.

(11) Housings are cylindrical, assuring maximum strength against internal or external pressure or side stress.

(12) Housing sections containing insulators well supported near both ends. No long overhangs.

(13) Adequate clearance between inside and outside housings makes telescoping easy.

(14) Good accessibility to insulators and conductor joints.

(15) No bolt or other openings through housing that require sealing at the time of field assembly.

(16) Housing mounting bolts completely external.

(17) Greatly reduced weight due to small support castings.

(18) Does not require accurate alignment of housings.

(19) Smooth exterior gives better appearance.

(20) Housing joints can be welded either initially or later.

Since numerous changes may be made in the above-described construction and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. In a bus structure, in combination, a first cylindrical housing section, a second cylindrical housing section spaced from the first section, a third cylindrical housing section telescoping over the first and the second sections, insulating spacers disposed between the third section and each of the other sections, a generally Z-shaped one-piece gasket disposed at each end of the telescoping section, said gasket having two offset legs connected by a leg extending at right angles to the offset legs, and a clamp encircling each gasket to compress said legs against the housing sections.

2. In a bus structure, in combination, a first cylindrical housing section, a second cylindrical housing section spaced from the first section, a third cylindrical housing section telescoping over the first and the second sections, a ring type one-piece gasket disposed at each end of the telescoping section, said gasket having offset horizontal legs engaging the outer peripheries of one of the sections and the telescoping section, said horizontal legs being connected by a vertical leg engaging the end of the telescoping section, and a clamp encircling each gasket to compress the horizontal legs against the peripheries of one housing section and the telescoping section and the vertical leg against one end of the telescoping section.

3. In a bus structure, in combination, a first cylindrical housing section, a second cylindrical housing section spaced from the first section, a third cylindrical housing section telescoping over the first and the second sections, insulating spacers disposed between the third section and each of the other sections, a ring type one-piece gasket disposed at each end of the telescoping section, said gasket being generally of a Z-shape in cross section and having horizontal legs engaging the outer peripheries of the sections with the vertical leg engaging the end of the telescoping section, and a clamp encircling each gasket, said clamp having horizontal legs engaging the horizontal legs on the gasket and a vertical leg engaging the vertical leg on the gasket.

4. In a bus structure, in combination, a first cylindrical housing section, a second cylindrical housing section spaced from the first section, a third cylindrical housing section telescoping over the first and the second sections, insulating spacers disposed between the third section and each of the other sections, a ring type gasket disposed at each end of the telescoping section, said gasket being generally of a Z-shape in cross section and having horizontal legs engaging the outer peripheries of the sections with the vertical leg engaging the end of the telescoping section, a clamp encircling each gasket, said clamp comprising two semicylindrical metal halves each having a cross section similar to the cross section of said gasket, a lug attached near each end of each half each lug having a curved surface, clamping bolts extending through said lugs for drawing said halves together, and washers on said bolts having curved surfaces engaging the curved surfaces on the lugs.

5. In a bus structure, in combination, a first cylindrical housing section, a second cylindrical housing section spaced from the first section, a third cylindrical housing section telescoping over the first and the second sections, insulating spacers disposed between the third section and each of the other sections, a ring type gasket disposed at each end of the telescoping section, said gasket having offset horizontal legs engaging the outer peripheries of one of the sections and the telescoping section, a plurality of alternate grooves and ridges in the horizontal legs of the gasket, and a clamp encircling each gasket with horizontal legs engaging the horizontal legs on the gasket to press said ridges against the housing sections.

References Cited in the file of this patent

UNITED STATES PATENTS

| 1,975,602 | Halperin et al. | Oct. 2, 1934 |
| 2,084,580 | Frank | June 22, 1937 |
| 2,396,131 | Scott | Mar. 5, 1946 |
| 2,560,114 | Kennon | July 10, 1951 |
| 2,738,992 | Heisler | Mar. 20, 1956 |
| 2,784,012 | Killian et al. | Mar. 5, 1957 |
| 2,835,723 | Killian et al. | May 20, 1958 |
| 2,850,299 | Risley | Sept. 2, 1958 |
| 2,892,012 | Swerdlow et al. | June 23, 1959 |

OTHER REFERENCES

AIEE Technical Paper 54–144 December 1953, 8 pages, "Cantilever Loaded Insulators for Isolated Phase Bus" by K. T. Ashdown and N. Swerdlow, both of General Electric Co.